Jan. 7, 1930.  D. C. DAUBMEYER ET AL  1,742,584
REEL
Original Filed April 22, 1926  2 Sheets-Sheet 1
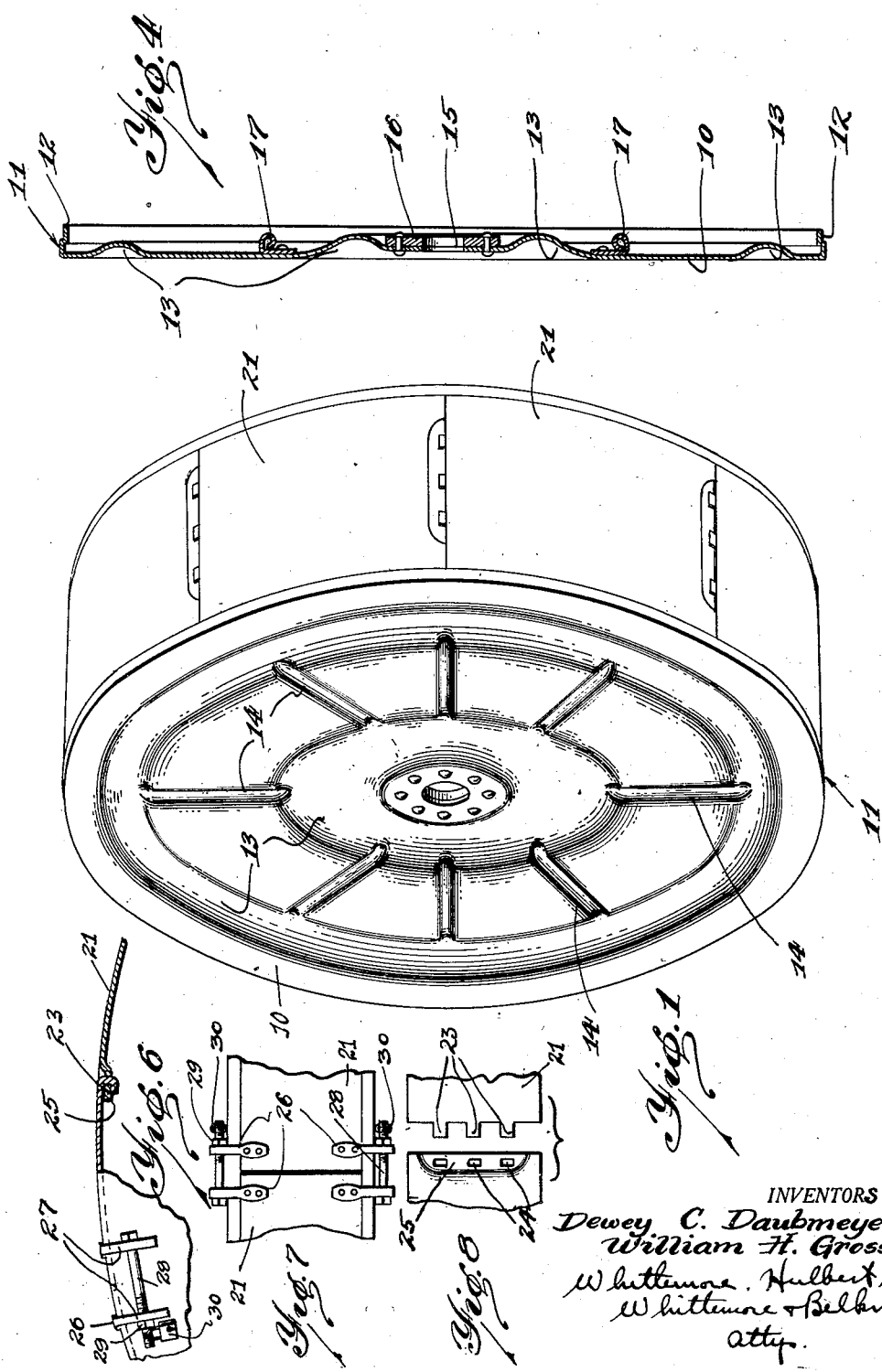
INVENTORS
Dewey C. Daubmeyer.
William H. Gross.
Whittemore, Hulbert,
Whittemore & Belknap
attys.

Jan. 7, 1930. D. C. DAUBMEYER ET AL 1,742,584
REEL
Original Filed April 22, 1926 2 Sheets-Sheet 2
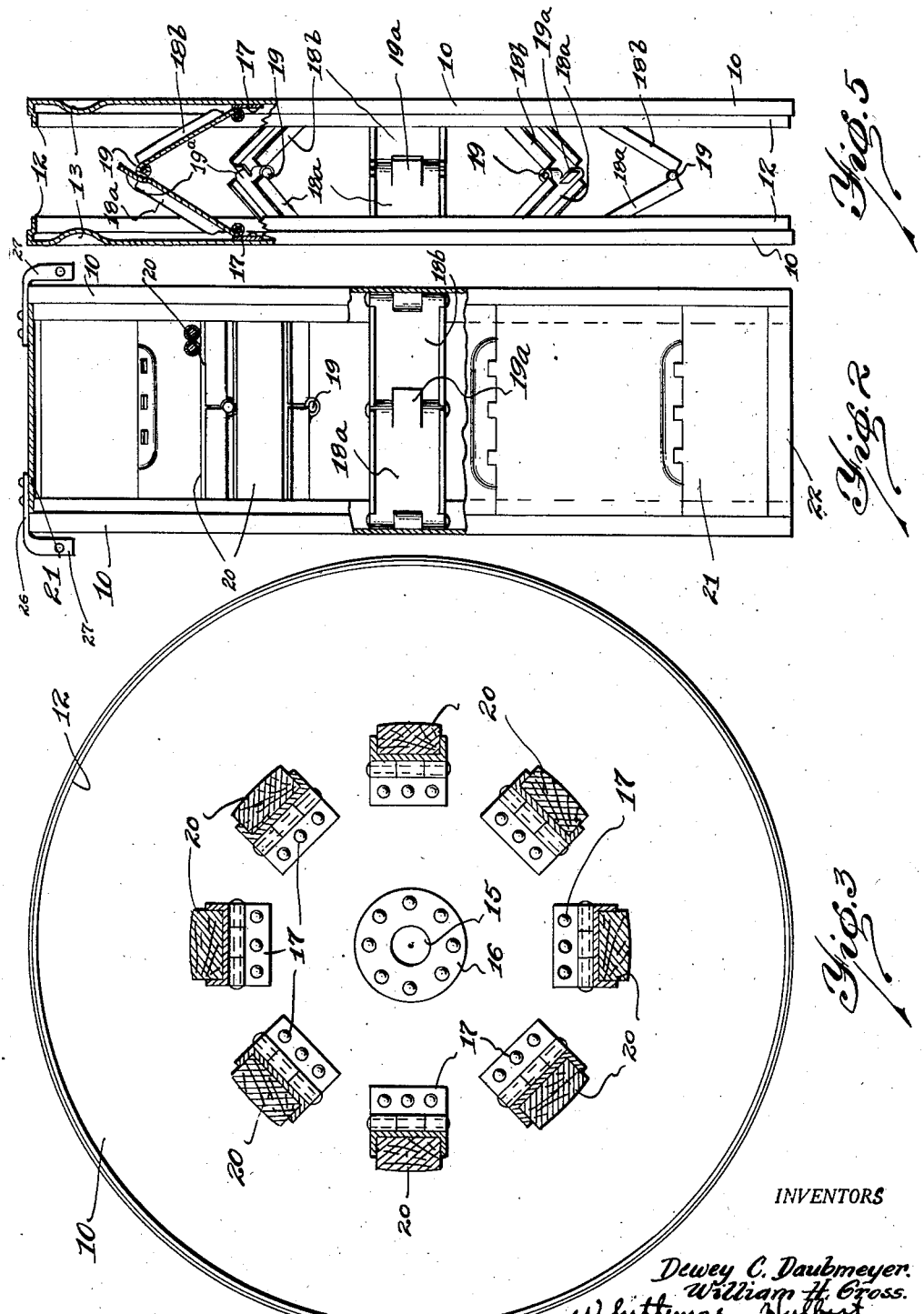
INVENTORS
Dewey C. Daubmeyer.
William H. Cross.
Whittemore, Hulbert
Whittemore + Belknap
attys Patented Jan. 7, 1930

1,742,584

UNITED STATES PATENT OFFICE

DEWEY C. DAUBMEYER AND WILLIAM H. GROSS, OF DETROIT, MICHIGAN

REEL

Application filed April 22, 1926, Serial No. 103,911. Renewed September 20, 1928.

This invention relates to reels and more especially to collapsible metallic reels of a size and strength sufficient to adapt them for use in holding heavy cable and the like used principally by public utility companies such as electric light and telephone companies.

It is now the universal practice to employ huge wooden reels upon which the cable is wound by the manufacturer and shipped to the consumer. The cost of these reels is added to that of the cable and the consumer to recover this amount must assume responsibility for the reel and return the same to the manufacturer undamaged. This entails and involves considerable trouble and expense on the part of the consumer as it must not only stand the expense of gathering the empty reels which are usually scattered about at various points in the city or other area served by the consumer, but they must also be shipped back to the manufacturer freight prepaid.

The size of these wooden reels heretofore used not only imposes a limitation on the number which can be loaded on a truck, thus necessitating the use of numerous trucks in gathering the reels and as a consequence making the truckage a considerable item, but the size of the reels makes the return shipment by freight uneconomical as the number of reels that can be stored in a freight car do not equal in weight the minimum weight charge of each freight car. Thus at present each return shipment of a carload of reels involves a distinct loss of a freight charge for several hundred pounds not utilized.

There are numerous other more or less serious disadvantages and objections to the use of the present wooden reels not in any respect compensated or offset by advantages or special utility prevalent therein.

One of these is the loss occasioned by the use of the reels as firewood, either by the employees of the consumer or by other unscrupulous persons while the reels are left unprotected upon the streets, either with the cable partly removed or when empty and before it has been possible to haul them to the storehouse of the consumer. Frequently whole reels are demolished and burned or so much of the reel is destroyed in this manner as to make reclamation of the remainder impractical or uneconomical.

It will also be obvious that there must be added to the losses as outlined above losses occasioned by accidental damage to the reels which damage must either be repaired by and at the expense of the consumer or the reels discarded entirely.

The amount charged the consumer as a deposit on each reel while varying in accordance with the reel size is a substantial amount in each instance ranging from forty to seventy-five dollars and the expense to the consumer in the form of interest on capital invested and in loss resulting from failure to return reels is an item of considerable importance. To this must be added the cost of repairing damaged reels, the truckage and labor cost incident to gathering empty reels and the aforementioned loss incident to the forced underloading of the freight cars in returning the empty reels to the manufacturer.

Another disadvantage prevalent with the use of the ordinary wooden reels is that the cable remaining on partly empty reels is frequently stolen when the reels are left unguarded either at day or night. The only protection to the cable is the lagging or covering which is secured by nails to the periphery of the reel but obviously this may be, and frequently is, easily removed by persons pilfering the cable. Thus great quantities of cable are stolen annually despite the efforts of the authorities and the patrols maintained by the consumers, which latter precaution involves expense additional to the cost of the stolen cable.

Furthermore, the cable manufacturer insists that the consumer, in order to recover the deposit on the lag or peripheral slats or covering of the reel, must return the same with all of the securing nails removed therefrom and exacts a penalty of five cents per slat for each one returned with nails remaining therein. Obviously attention must therefore be given to this detail otherwise the penalties would exceed the allowance made on returned lagging.

It will accordingly be apparent that while the present wooden reels may be considered to some extent practical they are nevertheless relatively inefficient and in addition extremely costly and unsatisfactory.

It is therefore an object of our invention to provide a reel capable of use in a manner identical with reels now in use but of a construction in which the objections, disadvantages and inefficiencies prevalent with the present reels are eliminated.

Consistent with this object the present invention contemplates a reel constructed of metal and of a collapsible nature. Thus the losses occasioned by fire and damage are eliminated. Furthermore, from six to ten times as many of these reels, when collapsed, may be carted or stored in a given space than is possible with the non-collapsible wooden reels and as a consequence a considerable saving is effected in truckage and freight.

With collapsible reels constructed in accordance with this invention it will be possible to more efficiently handle the empty reels which may be gathered by the company's service trucks and stored for instance in racks under the truck, thus to a great extent, if not entirely, eliminating the necessity of using other trucks for bringing in the empty reels. Furthermore, the invention contemplates sectional metallic lagging or covering for the reel which may be locked in place on reels left unprotected to thus prevent pilfering of the cable on filled or partly empty reels. Still another advantage of the metallic reel is that it may be made stronger than the wooden ones and also several hundred pounds lighter thereby materially lessening truckage and freight costs.

Various other objects, advantages, and novel details of construction of the invention will be made more apparent as this description proceeds, especially when considered in connection with the accompanying drawings wherein:

Figure 1 is a perspective view of a reel constructed in accordance with our invention, Figure 2 is a view partly in transverse vertical section and partly in elevation, Figure 3 is a central longitudinal section with certain parts omitted, Figure 4 is a central section through one of the reel side members, Figure 5 is a sectional elevational view of the reel partly collapsed, Figure 6 is a fragmentary detail sectional elevational view, Figure 7 is a fragmentary plan view of the interlocking lagging, and Fig. 8 is a separated plan view of two lag members.

Referring now particularly to the drawings wherein like reference characters refer to like parts throughout, it will be noted that the reel comprises two side members 10 formed of pressed metal, for instance pressed steel, of circular configuration. These members are each provided with a peripheral flange 11, the free edge of which may be of a relatively reduced diameter to provide a shouldered supporting ledge 12 for a purpose to be hereinafter set forth. Each plate member 10 may have circumferential and radial ribs 13 and 14 respectively pressed therein for the purpose of strengthening the structure and rendering the same more rigid. An aperture 15 formed coincident with the axis of each member 10 is reinforced by an apertured plate 16 riveted or otherwise secured thereto. A plurality of hinge parts 17 are also secured to the inner side of the member 10, these parts being distributed at equal points about a circle the center of which is the axis of the member 10.

The drum of the reel is composed of a plurality of sections, each consisting of two parts $18^a$ and $18^b$ hingedly united as at 19 on a line substantially coincident with the circumferential center of the reel and also hingedly connected to the two side plates 10 through the intermediary of the hinge parts 17 afore-described. The drum parts $18^a$ and $18^b$ are formed preferably of U-bars particularly because greater strength and rigidity are attained by such a construction. The adjacent ends may each be formed with a hinge part which cooperates with a hinge pintle to produce the hinge 19 as described. The outer ends of the parts $18^a$ and $18^b$ are formed with hinge parts cooperating with the hinge parts 17 for connection with the side plates 10. The flanges at the inner ends of the drum parts $18^a$ and $18^b$ abut to prevent the joint or hinge 19 from bending radially inwardly past the horizontal and in addition tongues $19^a$ may be provided on one or each of the parts $18^a$ or $18^b$ which will engage the respective companion part when the drum is fully extended to also prevent a bending of the joint 19 inwardly past the horizontal.

By means of this construction the side plate members 10 of the reel are collapsibly connected together by the drum members $18^a$ and $18^b$ is such a manner that these side plates may be moved toward one another with their axes in alignment or, in other words, without disaligning the disks 10. During such collapsing action the hinge joints 19 move radially outwardly while the outer ends of the drum members move inwardly toward one another. For preventing accidental collapsing of the reel before the cable has been wound thereon and for supporting this cable from direct engagement with the edges of the channel bars we employ filler blocks or strips 20 preferably of wood inserted in the channels of each or selected ones of the drum members with the ends of said blocks engaging the side plates 10 and with the upper faces of these blocks projecting above the edges of the channels. Obviously in collapsing the reel these blocks will be removed.

As a protection for the cable or the like contained on the reel we provide a length of metallic covering peripherally engaging the disks 10 and particularly the shouldered portions 12 thereof. This covering as illustrated in detail in Figures 6 and 7, consists of a plurality of interlocking sections or slats 21 of metal which may if desired have reinforcing ribs pressed therein. As shown, the adjacent slats 21 will preferably overlap at the center thereof and be provided with ears or portions 23 engaging slots or apertures 24 in the end of the adjacent section. The ears 23 do not extend to the edge of the sections 21 and the slots 24 are formed in a depressed or downwardly offset portion 25 so that the outer periphery of the lagging is of a uniform or smooth contour and furthermore the circumferential edge contour of the lagging is maintained in alignment for proper engagement throughout with the shoulders 12 of the slide plates. The shoulder portions 12 of the flanges 11 thus afford means for preventing endwise displacement of the covering and disposes the same within the periphery of the reel. Any desired means may be provided for uniting the ends of the covering strip or for attaching the covering at spaced points to the body of the reel.

One simple but efficient locking means is shown in the drawings and comprises laterally extending lugs 26 riveted or otherwise secured to the adjacent ends of adjacent end sections 21, which lugs have radially inwardly extending arms or portions 27. These portions 27 are provided with threaded apertures for engagement by bolts 28. Inasmuch as the ends of the sections 21 carrying these lugs will be in overlapping relation the entire lagging or covering may be drawn tightly about and into engagement with the reel by tightening nuts 29 on the bolts 28. A lock or the like 30 can be secured to each bolt to prevent the unauthorized removal of the covering.

From the foregoing it will be apparent that the reel may be collapsed from its operative position shown in Figure 2 to an inoperative condition as suggested in Figure 5. In this latter condition, that is when fully collapsed the edges of flanges 11 will abut and the folded drum will be entirely enclosed by the disks 10 and the flanges 11. Obviously the covering may be folded, or the sections disengaged and nested to occupy a reduced space also. The wooden filler blocks 20 may be discarded as they are relatively inexpensive and new ones can be used each time the reel is wound.

To those skilled in this art it will be immediately apparent that various changes may be made in many of the essential and all of the non-essential details of construction of the invention herein illustrated and to this end reservation is made to make such changes as may come within the purview of the accompanying claims.

What we claim as our invention is:

1. In a collapsible metallic reel capable of supporting relatively heavy cable or the like, such as used by public utilities, a pair of side plates providing protective sides for the cable, and drum forming means constructed to receive said cable, said drum forming means connecting said side plates and arranged to permit collapsing of said reel to provide compact storage and economical shipment thereof.

2. A collapsible metallic reel comprising in combination a pair of side plates, a plurality of members having their opposite ends hingedly connected to the side plates at points intermediate the centers and peripheries of the side plates, said members being circumferentially spaced to form a drum and a joint for said members intermediate their lengths, said drum being constructed to support relatively heavy electric cable or the like wound about said members between said members and the peripheries of said side plates, said side plates being constructed to support said drum and relatively heavy cable thereon.

3. In a collapsible metallic reel, a pair of side members and a drum connecting said side members including a plurality of sections each formed of two hingedly connected sections hingedly connected to said side members and foldable from extended load sustaining position radially outwardly to permit the axial collapsing of said side members and means on said sections for holding the same in load sustaining position.

4. In a collapsible reel, a pair of side members, a drum connecting said members and comprising a plurality of jointed sections folding radially outwardly in collapsing and means responsive to unfolding of said sections for holding the sections in load sustaining position.

5. The combination, in a reel, with a pair of side plates, of a drum composed of sections, each section having a hinge connection with the side plates and an intermediate joint with the end faces of said sections abutting to prevent inward radial movement of the joint beyond the horizontal.

6. In a collapsible reel, a pair of side members, a drum connecting said members comprising a plurality of jointed sections hinged to the side members foldable from extended load sustaining position outwardly and abutments carried by said sections and operable in load sustaining position.

7. In a collapsible reel, a pair of side members, a drum connecting said members comprising a plurality of jointed sections hinged to the side members foldable from extended load sustaining position outwardly and means on said sections and operable in load sustaining position for preventing further folding movement of said sections.

8. In a collapsible reel, a pair of side members, a drum connecting said members comprising a plurality of jointed sections hinged to the side members foldable from extended load sustaining position outwardly and stops functioning in the extended position of the drum for rendering the same load sustaining.

9. In a collapsible reel, a pair of side members and a drum connecting said members and comprising a plurality of jointed sections foldable from extended load sustaining position radially outwardly to permit collapsing of the reel.

10. A collapsible metallic reel comprising in combination a pair of side plates, a plurality of drum members having their opposite ends hingedly connected to the side plates at points intermediate the centers and peripheries of the side plates, and joints for said drum members moving radially outwardly to points within the peripheries of said side plates when said reel is collapsed.

11. In a collaspible reel, a pair of side plates and a drum composed of a plurality of sections each hinged at its ends respectively to said side plates and jointed intermediate its ends and foldable radially outwardly to permit a movement of said side plates axially toward one another during the collapsing of the reel.

12. In a collapsible reel, a pair of plate-like peripherally flanged side members and a drum pivotally connected to said side members and jointed to permit said side members to be moved toward one another to substantially enclose and house said drum.

13. In a collapsible reel for electric cable and the like a pair of plate-like side members providing imperforate protective sides for the cable and a drum pivotally connected to said side members and jointed to permit said side members to be moved into substantially abuting relation to protectively enclose the folded side members.

14. In a collapsible reel for electric cable and the like, a pair of plate-like side members providing substantially imperforate protective sides for the cable and a foldable drum pivotally connected to said side members to permit said side members to be collapsed to protect the folded drum.

15. In a collapsible reel, a pair of side plates and a drum composed of a plurality of U-bar sections each hinged at its ends respectively to said side plates and jointed intermediate its ends and foldable radially to permit a movement of said side plates axially toward one another during the collapsing of the reel, and filler strips in the channels of selected ones of said U-bars, for the purpose described.

16. In a collapsible metallic reel for supporting heavy electric cable and the like, a pair of plate-like end members, a drum connecting said end members including a plurality of U-bar sections, each section having hinge parts connecting the base of said U-bar at the ends thereof to hinge parts on said end members, a joint intermediate the ends of each section having abutting portions to prevent folding of the joint inwardly beyond extended position and reinforcing members insertable in the channels with the ends thereof overlying said hinge connections and abutting said end members.

17. In a metallic reel, capable of supporting relatively heavy cable or the like, such as used by public utilities, a pair of side plates providing protective sides for the cable, and drum forming means extending between said side plates and in its operative position being adapted to receive said cable, said drum forming means in its inoperative position permitting a reduction in size of said reel to provide compact storage and economical shipment thereof.

18. In a metallic cable reel, a pair of metallic side plates providing protective sides for the cable, drum supporting means secured to the opposed faces of said side plates, and drum forming means extending between said side plates and engaging said drum supporting means.

In testimony whereof we affix our signatures.

DEWEY C. DAUBMEYER.
WILLIAM H. GROSS.